J. W. GREENE.
Animal Traps.
No. 134,539. Patented Jan. 7, 1873.
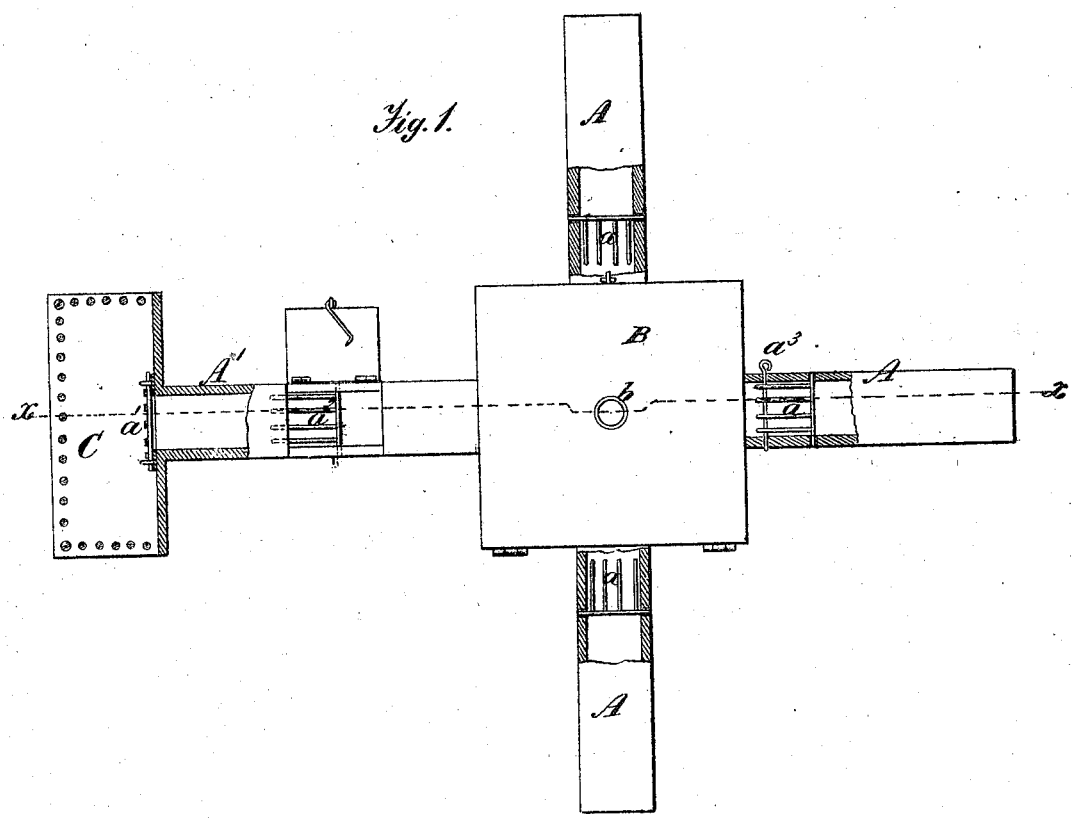
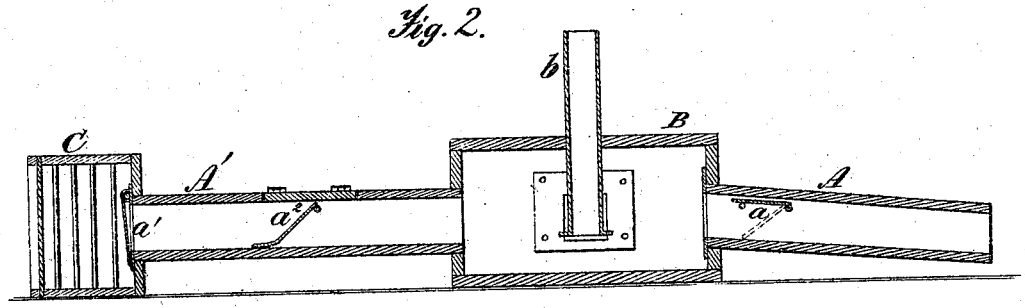

UNITED STATES PATENT OFFICE.

JACOB W. GREENE, OF CHILLICOTHE, MISSOURI.

IMPROVEMENT IN ANIMAL-TRAPS.

Specification forming part of Letters Patent No. 134,539, dated January 7, 1873; application filed November 1, 1872.

*To all whom it may concern:*

Be it known that I, JACOB W. GREENE, residing in Chillicothe, in the county of Livingston and State of Missouri, have invented an Improved Animal-Trap, of which the following is a specification:

This invention relates to an improvement in animal-traps of that class which are used in concealment in entrapping the animal, commonly called "decoy rat-harbors;" and it consists of a chamber or box, otherwise called a "harbor," having a number of radial entrance-tubes supplied with fall-doors, and, further, another tube leading to a cage or trap into which the animal is finally lodged, substantially as hereinafter more fully set forth.

In the drawing, Figure 1 illustrates a plan view of my animal-trap; and Fig. 2, a vertical section of the same, taken through the dotted line $x\ x$ of the former figure.

Corresponding parts in both of the figures are designated by similar letters of reference.

To enable others to make and use my invention, I will proceed to describe it.

A A refer to three tubes, connected to and communicating with the harbor, or baiting-chamber B, from which the said tubes radiate, and furnish entrances to the latter. Within each of these tubes is hung a fall-door, $a\ a$, the object of which being to cut off the return of the entrapped or confined animal or animals. Another tube, A', which leads from the harbor or chamber B to a cage, C, is for the purpose of conducting the animal to the latter, into which he is finally lodged and confined by means of a fall-door, $a^1$. A fall-door, $a^2$, is hinged within the tube A', which is intended for the purpose of insuring the entrance of the animal into the cage C. The said cage may be emptied of its contents by providing it with a door, or withdrawing one or more of its bars, a series of which its ends and one side are provided with, to admit light thereto, the object of which will be hereinafter set forth. $b$ is a tube suspended within the harbor or bait-chamber B, and also extending a short distance upward therefrom, as seen in the drawing. This tube is for the purpose of enabling the insertion of the bait into the chamber B. When it is desired to hold the doors $a\ a^2$ in an elevated position, it may be done by supporting their free ends upon a pin, $a^3$, Fig. 1, inserted in the sides of the tubes.

In practical use the device may be used in open view; but for the best results it is placed under a building, a pen, hay, straw, or other protection, in such manner as to prevent disturbance from outside. The entrances or openings of its tubes A A should be slightly let into the ground or otherwise covered, through which covering a suitable hole should be made for the animal to enter, thus having a tendency to allure him therein. The light must be allowed to have access to the cage C, in order that the animal, after having entered the harbor or bait-chamber B, and finding his escape cut off by way of the tube A, may be attracted to it, and thereby entrap himself. The entrance-tubes are fastened to the harbor B in an inclined position, so as to lead off water, should any accumulate in the latter; also to facilitate the burying or covering of their entrance ends without necessitating the covering of the rest of the device.

Having thus described my invention, what I claim, and desire to secure by Letters Patent, is—

The combination of the harbor or bait-chamber B with the entrance-tubes A A and tube A', connected to the cage C, supplied, respectively, with the doors $a\ a^2\ a^1$, substantially as and for the purpose set forth.

In testimony whereof I have hereunto signed my name this 28th day of October, A. D. 1872, in presence of two subscribing witnesses.

JACOB W. GREENE.

Witnesses:
J. H. DAVIS,
W. T. GREENE.